Sept. 3, 1963  R. C. DENISON  3,102,909
DI (MONO-LOWER ALKANOYL-CALCIUM) CARBONATES
Filed July 14, 1958
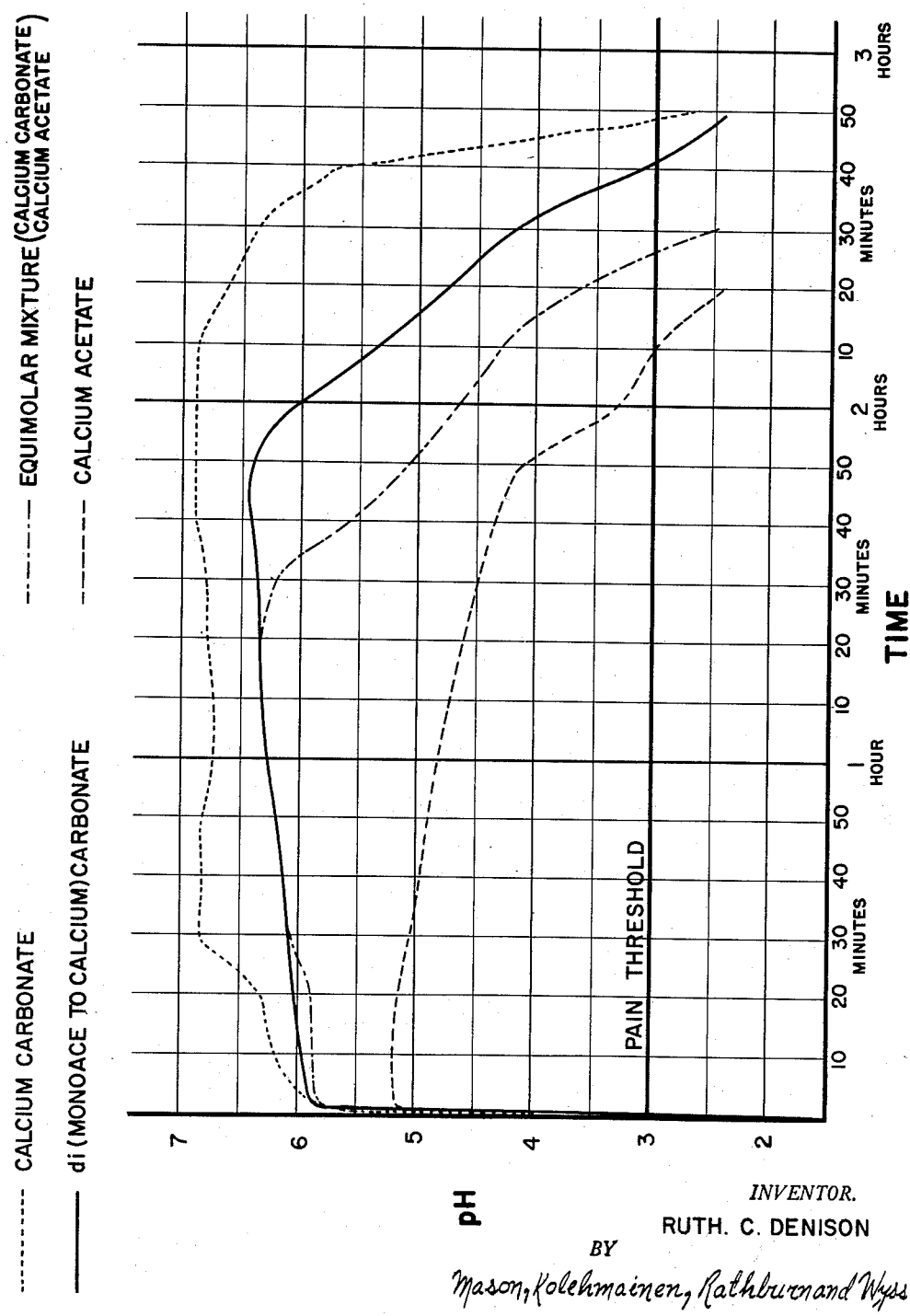
INVENTOR.
RUTH C. DENISON
BY
Mason, Kolehmainen, Rathburn and Wyss
ATTORNEYS

United States Patent Office 3,102,909
Patented Sept. 3, 1963

3,102,909
DI(MONO-LOWER ALKANOYL-CALCIUM) CARBONATES
Ruth C. Denison, Signal Mountain, Tenn., assignor to Mrs. John W. Bradley, Lookout Mountain, Tenn.
Filed July 14, 1958, Ser. No. 748,481
4 Claims. (Cl. 260—541)

This invention relates to antacids and their production. More particularly, it relates to di(monoacetocalcium) carbonate and to related salts containing higher alkano radicals in lieu of the aceto or acetoxy radical. The invention also relates to the production of such substances and their use as antacids for medicinal purposes in the relief of excessive gastric acidity.

Gastric antacids are substances which lower the acidity of stomach fluids when ingested. When antacids are used under the supervision of a physician, their primary object is to raise the pH of the gastric juices above the so-called "pain threshold" of pH 3.0 to a value in the range of 3.0 to 4.0. When used in self-medication, however, it is desirable that gastric antacids raise the pH of stomach fluids to somewhat higher values in the range of pH 4.0 to above 6.0. Proprietary antacids which are used for providing safe, fast and lasting relief from heartburn, indigestion, gas and upset or sour stomach due to excess gastric acidity, are more effective at higher pH ranges of above 4.0. An example of such antacid is dihydroxy aluminum sodium carbonate sold under the trademark "Rolaids" and disclosed in U.S. Patent No. 2,783,179. It is important that such gastric antacids should not reduce the acidity of the stomach to an extent which will bring about an increase in gastric secretion, the so-called "acid rebound" which occurs at pH of 7 to 8, or reduce the acidity to a point where normal digestion is adversely affected.

It is desirable that antacids be prepared which have all of the advantages of aluminum hydroxide and avoid its disadvantages. More specifically, it is desirable that antacids be available which promptly raise the pH of gastric juices to values above pH 4 and maintain the pH values above that point for extended periods of time in excess of an hour. Such antacids should be stable on long standing and should not lead to insoluble or slow acting materials as does aluminum hydroxide. Furthermore, these substances should be essentially non-toxic and should not result in acid rebound. They should be effective in relatively small doses and capable of neutralizing substantial quantitties of dilute acid. In addition, they should be devoid of taste and should be available from readily obtained chemicals.

It is an object of this invention to provide antacids of the type described above. It is a further object of this invention to provide simple and efficient methods of producing such antacids from readily available materials. It is a further object of this invention to provide antacids having advantages over antacid materials previously known. A further object is to provide a safe, rapid and efficient method of reducing gastric hyperacidity by administration of di(monoacetocalcium) carbonate in appropriate dosage. Another object is to provide continuous medication in cases of gastric hyperacidity. These and other objects will be apparent from and are achieved in accordance with the following disclosure.

The attached single-figure drawing shows the pH curves of acidic gastric juice when admixed with di(monoacetocalcium) carbonate, with calcium carbonate, with calcium acetate, and with an equimolar mixture of calcium carbonate and calcium acetate. In each curve the pH of the juice is plotted against time from the data given in Table 1. It is seen that the curve for di(monoacetocalcium) carbonate is different from the other three curves. Of particular sgnificance is the fact that the curve of di-(monoacetocalcium) carbonate is different from that of the equimolar mixture of calcium carbonate and calcium acetate and that the pH of the juice with di(monoacetocalcium) carbonate continues to rise for about half an hour after it starts to fall with the mixture. Di(monoacetocalcium) carbonate maintains the gastric juice above pH 4 for an extended period of time well in excess of 2 hours.

Di(monoacetocalcium) carbonate is believed to have the following formula

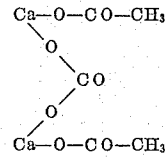

The related homologous compounds have the general formula

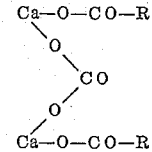

wherein R is methyl, ethyl or propyl. When R is methyl, the compound is di(monoacetocalcium) carbonate shown above. When R is ethyl, the compound is di(monopropionocalcium) carbonate. Each calcium atom can combine with 2 molecules of hydrochloric acid in the gastric juice, thereby buffering the juice by liberating carbon dioxide and an alkanoic acid, the latter being very much weaker than hydrochloric acid. One molecule of di-(monoacetocalcium) carbonate can thus buffer 4 molecules of hydrochloric acid. Di(monoacetocalcium) carbonate is, therefore, a buffer-type, non-systemic antacid in that the acid removed from the gastric juices can then be released in the intestines, thereby avoiding upsetting of the acid-base balance of the body and the possibility of alkalosis.

In contrast to dry aluminum hydroxide, di(monoacetocalcium) carbonate shows no tendency in the dried state to change its acid neutralizing properties either as to speed or amount of acid neutralized. It can be formulated with conventional excipients, such as sugar, starch, dextrins and other binders into tablets which disintegrate readily when ingested and which provide prompt and prolonged neutralization after years of storage. It can be administered to adults in the form of tablets or magma in dosages of 4 to 15 grains and to children in dosages of 1 to 5 grains.

Because the antacid preparations of this invention are more effective than aluminum hydroxide, lower dosages can be used. Because no aluminum is ingested, they exhibit a much lower constipating effect than do conventional antacids, such as aluminum hydroxide gel, and they do not tend to produce diarrhea. There is no evidence that they interfere with normal digestive processes or irritate the stomach.

Di(monoacetocalcium) carbonate can be readily prepared by reacting calcium carbonate with a concentrated aqueous solution of acetic acid containing an equivalent quantity of the acid. The presence of a minimum amount of water is requisite for the best product. The reaction should be completed and the water removed at the earliest possible time so as to prevent hydrolysis of the product to calcium acetate and calcium carbonate. The product can be prepared by starting at room temperature but preferably the acid is at an elevated temperature (60° C. or above). The product can be dried in air after it has formed, but it has been found advantageous to add absolute ethanol or similar alkanol to the newly formed solid as soon as the evolution of carbon dioxide has subsided. This removes the residual water and speeds the drying of the product at the same time as it makes it unnecessary to subsequently wash the product to remove any unreacted acetic acid. The product forms a fine white powder which can be handled easily and can be readily ground to a fine light powder suitable for formulation of tablets for pharmaceutical use.

Di(monoacetocalcium) carbonate has excellent buffering capacity with very rapid and prolonged antacid action. In Table 1 below are given comparative data illustrating the buffering action of this compound in comparison to the action of calcium carbonate, calcium acetate and an equimolar mixture of calcium carbonate and calcium acetate. In these experiments 2 grams of substance were added to 150 ml. of acidic gastric juice and the pH of the mixture plotted against time, according to the general method of Holbert et al., Journal of The American Pharmaceutical Association, Scientific Edition, volume 37, pages 292 et seq. (1948). The gastric juice was strongly acidic, having an initial pH of about 1.60. The juice was maintained at body temperature (37.5° C.) throughout the measurements. It is seen that di(monoacetocalcium) carbonate raises the pH of the gastric juice to about 3.0 very rapidly and maintains it in the range above 4.0 for more than 2 hours. These results compare very favorably with well known antacids in medical use.

TABLE No. 1

| Time | Di(monoacetocalcium) carbonate | Equimolar mixture: calcium carbonate, calcium acetate | Calcium carbonate | Calcium acetate |
| --- | --- | --- | --- | --- |
| Start | 1.65 | 1.60 | 1.60 | 1.60 |
| 15 Sec | 5.15 | 5.35 | 5.20 | 5.05 |
| 1 Min | 5.80 | 5.75 | 5.62 | 5.15 |
| 2 Min | 5.85 | 5.80 | 5.83 | 5.18 |
| 5 Min | 5.90 | 5.80 | 6.00 | 5.18 |
| 10 Min | 5.95 | 5.81 | 6.18 | 5.18 |
| 20 Min | 6.00 | 5.87 | 6.27 | 5.12 |
| 30 Min | 6.10 | 6.02 | 6.85 | 5.05 |
| 40 Min | 6.10 | 6.10 | 6.80 | 4.98 |
| 50 Min | 6.20 | 6.22 | 6.83 | 4.89 |
| 60 Min | 6.30 | 6.34 | 6.70 | 4.80 |
| 70 Min | 6.35 | 6.35 | 6.71 | 4.69 |
| 80 Min | 6.30 | 6.33 | 6.79 | 4.58 |
| 90 Min | 6.30 | 6.20 | 6.77 | 4.47 |
| 100 Min | 6.40 | 5.52 | 6.90 | 4.32 |
| 110 Min | 6.40 | 5.03 | 6.90 | 4.13 |
| 120 Min | 6.07 | 4.65 | 6.88 | 3.28 |
| 130 Min | 5.35 | 4.28 | 6.87 | 3.00 |
| 140 Min | 4.75 | 3.54 | 6.60 | 2.44 |
| 150 Min | 4.23 | 2.50 | 6.35 |  |
| 160 Min | 3.05 |  | 5.60 |  |
| 170 Min | 2.40 |  | 2.70 |  |

The acid consuming power of di(monoacetocalcium) carbonate was demonstrated by adding 0.25 gram of the powdered antacid material to 75 ml. of 0.100 N hydrochloric acid solution. The solution was gently agitated for 10 minutes and then back titrated with 0.1 N sodium hydroxide solution to a pH of 3.8. The acid consuming power is expressed as milliliters of 0.100 N hydrochloric acid consumed by one gram of sample. When so tested, di(monoacetocalcium) carbonate had an acid consuming power of 148. Calcium carbonate had a corresponding value of 201, calcium acetate 101, and an equimolar mixture of the two 134.

The invention is further disclosed by the following examples which are provided for purposes of illustration only. It will be appreciated by those skilled in the art that numerous modifications in equivalent materials, times, temperatures, concentrations and the like may be made without departing from the invention.

*Example 1*

60 parts of glacial acetic acid diluted with 50 parts of water were warmed to 85° C. Then 100 parts of powdered calcium carbonate were added in one portion with vigorous agitation while the reaction vessel was kept at about 85° C. The vigorous evolution of carbon dioxide cooled the mixture. Stirring was continued vigorously until the mixture set to a hard porous solid which could not be further agitated. This occurred in a relatively short time under the conditions described above, usually in a period of approximately 1 minute, and thereafter the evolution of carbon dioxide was no longer noticeable. The lumps of porous solid product were broken up as soon as possible and mixed with about 200 parts of boiling absolute ethanol and the mixture filtered with suction after a few minutes. The filter cake could be further washed with an additional portion of 100 parts of hot absolute ethanol followed by filtration. The filter cake of di(monoacetocalcium) carbonate was broken up and air dried at about 40° C. The product was a hard white powder, which when broken up, contained none of the needle-like crystals characteristic of calcium acetate.

The foregoing reaction may be carried out at a temperature between room temperature (about 20° C.) and about 95° C. The amount of water is generally kept below about 3.5 moles per mole of glacial acetic acid although a small amount, at least approximately 0.5 mole of water, appears to be necessary for the reaction to occur between the acid and the calcium carbonate. After the reaction has been completed the product may be washed with an alcohol or other water-miscible volatile organic solvent, such as acetone, to remove water and any unreacted organic material.

The theoretical yield of di(monoacetocalcium) carbonate from 100 parts of calcium carbonate is 129 parts, based upon the formula weight of 258.21 for di(monoacetocalcium) carbonate. The yield obtained in the foregoing example amounts to 126 to 127 parts rather uniformly.

*Example 2*

Six-grain tablets of di(monoacetocalcium) carbonate are prepared from the following formulation:

| | Grams |
| --- | --- |
| Di(monoacetocalcium) carbonate | 71,500 |
| Corn starch, USP (dried CMC), for slugging | 7,150 |
| Powdered sugar (XXXXXX) | 3,550 |
| Calcium citrate | 838 |
| Magnesium stearate for slugging | 1,600 |
| Pectin, NF | 838 |
| Corn starch, dried (disintegrator) | 4,200 |
| Methyl salicylate, USP | 10.5 |
| Oil of peppermint | 105 |
| Ethyl ether | 150 |
| Magnesium stearate for granules | 400 |

The di(monoacetocalcium) carbonate, corn starch for slugging, powdered sugar, methyl salicylate, oil of peppermint and ethyl ether are mixed and milled. Then the magnesium stearate for slugging is mixed in and the mixture is slugged. The preparation is granulated through a No. 8 screen and reslugged. It is then granulated through a No. 14 screen and the granules classified, those passing the No. 14 screen and remaining on a No. 40 screen being retained. The fines are reslugged and classified as above. To the finished granules are added corn starch (disintegrator), calcium citrate, pectin and magnesium stearate for granules and the product is mixed in a tumbler mixer and pressed into tablets weighing 452 milligrams each. Each tablet contains 357 milligrams (6 grains) of di(monoacetocalcium) carbonate.

In an analogous way there can be prepared 5-grain and 7½-grain tablets of di(monoacetocalcium) carbonate.

What is new and is desired to be secured by Letters Patent of the United States is:

1. As a composition of matter, di(monoacetocalcium) carbonate.

2. As a composition of matter, a compound of the following formula $$Ca_2CO_3(OCOR)_2$$

wherein R is a lower alkyl radical.

3. A method of producing di(monoacetocalcium) carbonate which comprises reacting calcium carbonate with an aqueous solution of acetic acid containing substantially 1 mole of acetic acid per mole of calcium carbonate at a temperature in the range of 20 to 95° C. and separating the di(monoacetocalcium) carbonate thus formed.

4. A method of producing a calcium salt of the formula $$Ca_2CO_3(OCOR)_2$$

wherein R is a lower alkyl radical, which comprises reacting 1 mole of calcium carbonate with 1 mole of an alkanoic acid of the formula $$R-COOH$$

wherein R has the meaning given above, at a temperature in the range of 20 to 95° C. and separating the calcium salt thus formed.

References Cited in the file of this patent

UNITED STATES PATENTS

| | | |
|---|---|---|
| 2,362,386 | Lipschitz | Nov. 7, 1944 |
| 2,802,773 | Beekman | Aug. 13, 1957 |
| 2,816,136 | Pera | Dec. 10, 1957 |
| 2,872,479 | Letsinger | Feb. 3, 1959 |
| 2,880,136 | Gore | Mar. 31, 1959 |

OTHER REFERENCES

U.S. Dispensatory, 25th ed., 1955, pages 217 and 218.
Investa, Chemical Abstracts, vol. 50, page 2260, (1956) (abstract of Belgian Patent No. 512,952, Nov. 16, 1952).